(12) United States Patent
Rowlands et al.

(10) Patent No.: US 10,929,316 B2
(45) Date of Patent: Feb. 23, 2021

(54) STORAGE-BASED SLOW DRAIN DETECTION AND AUTOMATED RESOLUTION

(71) Applicant: EMC IP Holding Company LLC, Hopkinton, MA (US)

(72) Inventors: Scott Rowlands, Marietta, GA (US); Erik P. Smith, Douglas, MA (US); Alan Rajapa, North Smithfield, RI (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/374,182

(22) Filed: Apr. 3, 2019

(65) Prior Publication Data

US 2020/0320025 A1 Oct. 8, 2020

(51) Int. Cl.
| | |
|---|---|
| *H04L 12/801* | (2013.01) |
| *G06F 13/40* | (2006.01) |
| *G06F 13/42* | (2006.01) |
| *G06F 13/16* | (2006.01) |

(52) U.S. Cl.
CPC ...... *G06F 13/1668* (2013.01); *G06F 13/4022* (2013.01); *G06F 13/4221* (2013.01); *G06F 2213/0036* (2013.01)

(58) Field of Classification Search
CPC ........... G06F 13/40; G06F 13/42; H04L 47/10
See application file for complete search history.

(56) References Cited

U.S. PATENT DOCUMENTS

| | | | | |
|---|---|---|---|---|
| 10,425,344 | B2* | 9/2019 | Ma | H04L 47/30 |
| 10,645,437 | B2* | 5/2020 | Ramaraj | H04L 65/602 |
| 2001/0032269 | A1* | 10/2001 | Wilson | H04L 47/30 |
| | | | | 709/235 |
| 2003/0126297 | A1* | 7/2003 | Olarig | H04L 47/2433 |
| | | | | 709/250 |
| 2008/0175160 | A1* | 7/2008 | Cometto | H04L 47/10 |
| | | | | 370/252 |
| 2014/0032781 | A1* | 1/2014 | Casey | H04L 29/06027 |
| | | | | 709/233 |
| 2017/0171091 | A1* | 6/2017 | Nayak | H04L 47/25 |
| 2019/0303281 | A1* | 10/2019 | Firoozshahian | H04L 47/12 |

* cited by examiner

*Primary Examiner* — David E Martinez
(74) *Attorney, Agent, or Firm* — Amin, Turocy & Watson, LLP

(57) ABSTRACT

Storage-based slow drain detecting and automated resolution is provided herein. A data storage system as described herein can include a memory that stores computer executable components and a processor that executes computer executable components stored in the memory. The computer executable components can include a switch query component that obtains a host transfer rate negotiated between a host device and a network switch from a host-connected port of the network switch; a comparison component that compares the host transfer rate to an array transfer rate negotiated between the network switch and a storage array; and a rate limiter component that limits a data transfer from the storage array to the host device to the host transfer rate in response to the host transfer rate being less than the array transfer rate.

20 Claims, 11 Drawing Sheets

STORAGE-BASED SLOW DRAIN DETECTION AND AUTOMATED RESOLUTION

TECHNICAL FIELD

The subject application is related to data storage systems, and more particularly, to techniques for improving data transfer efficiency in a data storage system.

BACKGROUND

Data storage systems can utilize storage arrays composed of multiple storage disks to maintain large amounts of data, making them highly desirable for industries such as e-commerce, energy, media, etc. Additionally, a data storage system can utilize networked devices such as a server (e.g., via a host adapter and/or other hardware or software components) to manage the flow of data to and from the storage array. In these implementations, a network switch can act as an intermediary to facilitate the flow of data between the storage array and a host adapter and/or other mechanisms at the server.

In a conventional data storage system, the storage array and host adapter can negotiate a transfer speed with the network switch independently. In the event that the storage array negotiates a higher speed than the host, a condition known as slow drain can occur in which the storage array attempts to send data to the host at a rate that is too high for the host to process. This, in turn, consumes buffers at the network switch and/or otherwise results in network congestion that can impact all traffic associated with the switch, including the storage array, the host, and any other connected devices. As a result, it is desirable to implement techniques to mitigate the occurrence of slow drain in order to improve network performance associated with a data storage system.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a switch query component that obtains a host transfer rate negotiated between a host device and a network switch from a host-connected port of the network switch, a comparison component that compares the host transfer rate to an array transfer rate negotiated between the network switch and a storage array, and a rate limiter component that limits a data transfer from the storage array to the host device to the host transfer rate in response to the host transfer rate being less than the array transfer rate.

In another aspect, a method is described herein. The method can include receiving, by a device operatively coupled to a processor, a host transfer rate as established by a host device and a network switch from a host-connected port of the network switch; comparing, by the device, the host transfer rate to an array transfer rate as established by the network switch and a storage array; and throttling, by the device, a data transfer from the storage array to the host device to the host transfer rate in response to the host transfer rate being less than the array transfer rate.

In an additional aspect, a machine-readable storage medium including executable instructions is described herein. The instructions, when executed by a processor, can facilitate performance of operations including obtaining a first transfer rate as established between a host device and a network switch from a port of the network switch to which the host device is connected, comparing the first transfer rate to a second transfer rate as established between the network switch and a storage device, and limiting a data transfer from the storage device to the host device to the first transfer rate in response to the first transfer rate being less than the second transfer rate.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
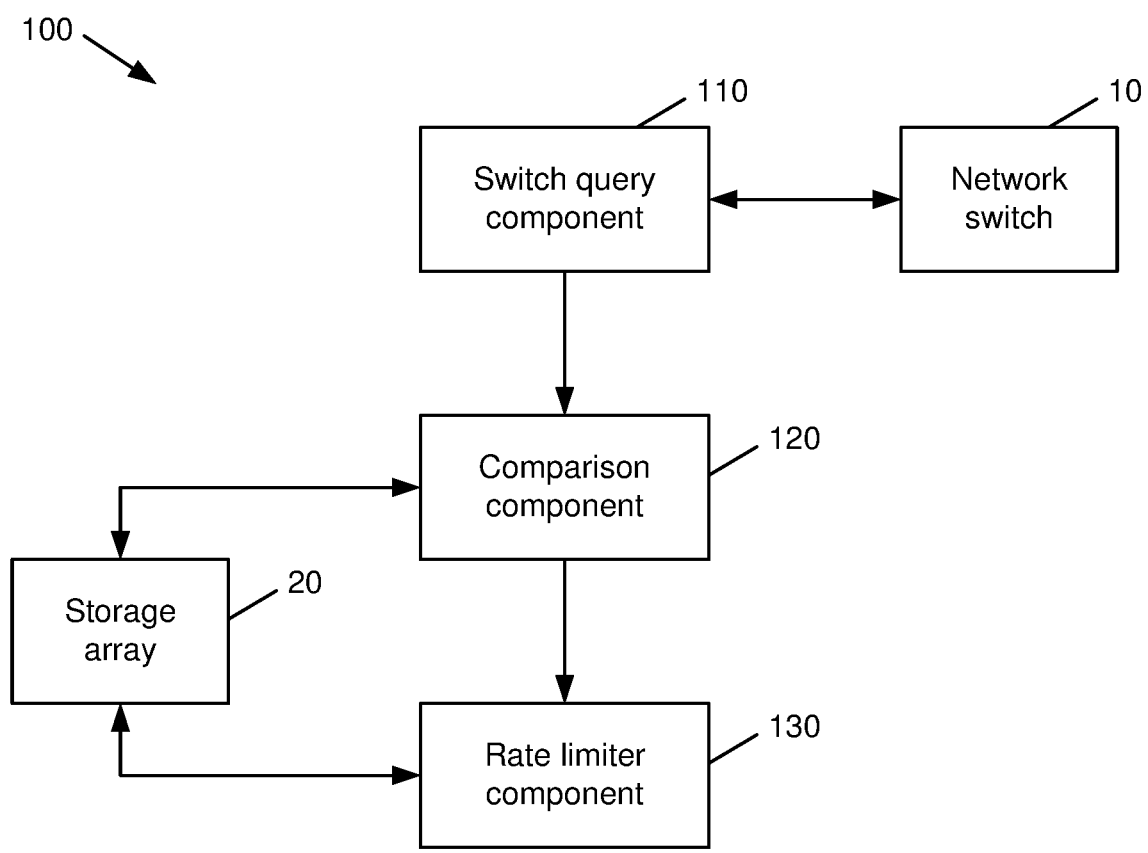
FIG. 1 is a block diagram of a system that facilitates storage-based slow drain detection and automated resolution in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Various aspects described herein provide techniques by which slow drain can be mitigated and/or prevented in a data storage system. In an aspect, a data storage system can include a storage array that includes one or more storage disks or other storage devices, which can communicate with a server and/or host device via a network switch and/or other network devices. Communications between the storage array and host can be conducted in this manner using a multi-layered approach. For example, the host and storage array can communicate according to a first protocol such as Fibre Channel (FC), and the FC messages transmitted between the host and storage array can carry information and/or commands for storage access according to a second protocol such as the Small Computer System Interface (SCSI) protocol.

In general, slow drain can occur, among other scenarios, in cases where the storage array (e.g., via an array port at the network switch) negotiates a faster transfer speed than the host (e.g., via a host port at the network switch). When the host port negotiates a higher speed, the array port can slow the rate of write payload sent by the host by various means, such as the XFR_RDY (Transfer Ready) mechanism. However, when the array port negotiates a higher speed than the host port, or when a single host port is accessing multiple storage ports that have an aggregate bandwidth greater than the host port, on a read operation the array can send data to the host at a rate that is above that which the host can process. As a result, switch credit buffers can be consumed, which can adversely impact all network traffic associated with the switch. Further, because the storage array is a passive target entity in SCSI rather than an initiator and therefore cannot initiate input/output with the host via SCSI, the array has no mechanisms under SCSI to slow the array port to prevent slow drain from occurring. In present implementations, a system administrator can be made aware of slow drain only after its impact has already occurred, and the impact of slow drain can be resolved only through manually obtaining and matching host and array port speeds to find the source of the slow drain. This can be a very complex and time-consuming process, especially for systems that employ a large number of switches and/or switch ports.

To the furtherance of the above and/or related ends, embodiments described herein enable a storage array to regulate transfer speed via communications between the array and the network switch over a transport protocol, e.g., FC, that is utilized to carry commands and/or payload associated with SCSI and/or other similar protocols. This can bypass and/or mitigate restrictions placed on communications from the array to the host via protocols such as SCSI.

By implementing various embodiments as described herein, various improvements to the operation of a computing system and/or other advantages can be achieved. These can include, but are not limited to the following. Data transfer speed and reliability can be increased. Internal storage (e.g., buffers or the like) utilization by a network switch can be reduced. Transfer speed of information communicated through a network switch, including communications between a storage array and a host device as well as other communications between other devices connected to the switch, can be increased. Other advantages are also possible.

With reference now to the drawings, FIG. 1 illustrates a system 100 that facilitates storage-based slow drain detection and automated resolution in accordance with various aspects described herein. As shown in FIG. 1, system 100 includes a switch query component 110 that can obtain a host transfer rate as negotiated between a host device and a network switch 10 from a host-connected port of the network switch 10. As stated above, the switch query component 110 can be implemented, e.g., by one or more storage-connected ports of the network switch 10 and/or a storage array 20, to obtain transfer rate information associated with the host device in a manner that bypasses restrictions on commands issued from the storage array 20 to a host device under SCSI and/or other related protocols. Various implementations that can be utilized for the switch query component 110 and/or other components as described with reference to FIG. 1 and the figures that follow are described in further detail below.

System 100 as shown in FIG. 1 also includes a comparison component 120 that can compare the host transfer rate as obtained by the switch query component 110 from the network switch 10 to an array transfer rate as negotiated between the network switch 10 and the storage array 20. System 100 further includes a rate limiter component 130 that can, in response to the host transfer rate as obtained by the switch query component 110 being less than the array transfer rate, limit a data transfer from the storage array 20 to a host device in accordance with various procedures as described below. Accordingly, system 100 can act to control a system transfer rate in cases where the negotiated transfer rate of the array exceeds that of the host, thereby mitigating and/or preventing instances of slow drain as described above in an automated manner without manual administrator intervention.

Figure 2:
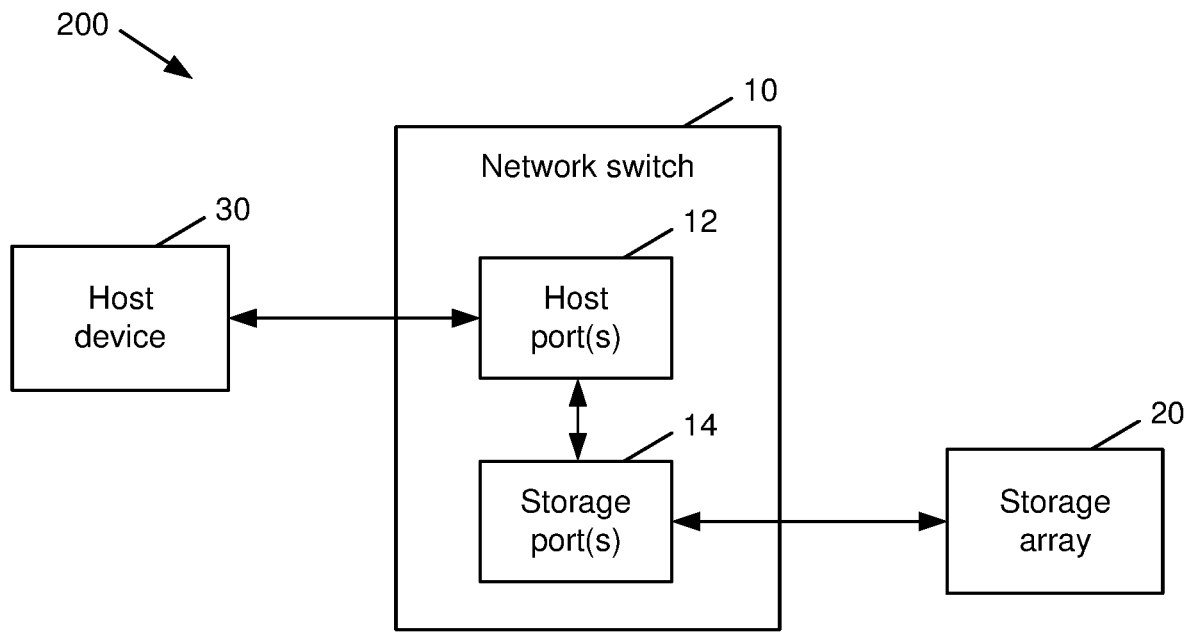
FIG. 2 is a block diagram of a system that facilitates communication between a host device and a storage array via a network switch in accordance with various aspects described herein.

Turning now to FIG. 2, a block diagram of a system 200 that facilitates communication between a host device 30 and a storage array 20 via a network switch 10 in accordance with various aspects described herein is illustrated. System 200 and the description that follows are intended to provide an example networked architecture in which various aspects described herein can function. It should be appreciated, however, that other network configurations could also be used.

As shown in FIG. 2, system 200 includes a host device 30 and a storage array 20, which can communicate with each other via a network switch 10. In an aspect, the network switch 10 can be a FC switch that can enable the storage array 20 and host device 30 to communicate commands and other information pursuant to one or more other protocols, such as SCSI or the like. Other communication protocols could also be used in addition to, or in place of, the FC protocol. For instance, the network switch 10 could also be an Ethernet switch and/or operate according to any other suitable protocol.

In an aspect, the host device 30 can be a computing device that operates as a server or host for a data storage system. The host device 30 can act as an initiator to send various commands to the storage array 20, which can act as a target for the commands sent by the host device 30. In an example, commands sent by the host device 30 can be commands of a first protocol (e.g., SCSI) that are carried on a second, different protocol (e.g., FC).

In another aspect, the host device 30 can include a host bus adapter (HBA) that provides a communication link from the host device 30 to the storage array 20. To this end, the HBA can facilitate a connection from the host device 30 to the network switch 10 via one or more ports of the network switch 10. The storage array 20, in turn, can similarly connect to the network switch 10 via one or more ports of the network switch 10. As used herein, ports of the network switch 10 to which the host device 30 are connected are referred to as host ports 12, and ports of the network switch to which the storage array 20 are connected are referred to as storage ports 14. It should be appreciated, however, that there may not be structural or functional differences between the host port(s) 12 and storage port(s) 14, and that the host device 30 and storage array 20 can be configured to connect to any suitable port(s) of the network switch 10.

In an aspect, the host ports 12 and storage ports 14 of the network switch 10 can be configured for communication via zoning. For instance, if the host device 30 (e.g., via an HBA) connects to the network switch 10 through a host port 12 and the storage array 20 connects to the network switch 10 through a storage port 14, the two ports can be logically connected, e.g., the host port 12 can be zoned to the storage port 14, to enable the host device 30 to synchronize with the storage array 20 via the network switch 10.

In addition, the storage array 20 and the host device 30 can independently negotiate transfer speeds with the network switch 10 based on their individual capabilities. By way of specific example, if the network switch 10 is capable of transfer speeds up to 32 gigabits/second (gb/s) and the host device 30 is capable of transfer speeds of only up to 4 gb/s, the network switch 10 and host device can negotiate the lower of these speeds, e.g., 4 gb/s, as the transfer speed between to be used for subsequent transfers of information between the host device 30 and the network switch 10. The storage array 20 can negotiate a transfer speed with the network switch 10 in a similar manner.

In an aspect, the network switch 10 can include credit buffers and/or other mechanisms to temporarily store data in transit to account for differences in transfer speed between the storage array 20 and the host device 30. For example, if the storage array 20 and host device 30 both negotiate the same transfer speed, the buffers at the network switch 10 can be utilized to maintain continuity of transmission in the event of small speed fluctuations due to changing network conditions or the like. Problems can arise, however, when the storage array and host device 30 negotiate different speeds with the network switch 10. For instance, if the storage array 20 negotiates a faster speed than the host device 30, the network switch 10 will receive data from the storage array 20 faster than the host device 30 can drain that data. This can result in the buffers of the network switch 10 being consumed, which in turn can cause the network switch 10 to delay communications from the storage array 20 as well as any other devices connected to the network switch 10.

Figure 3:
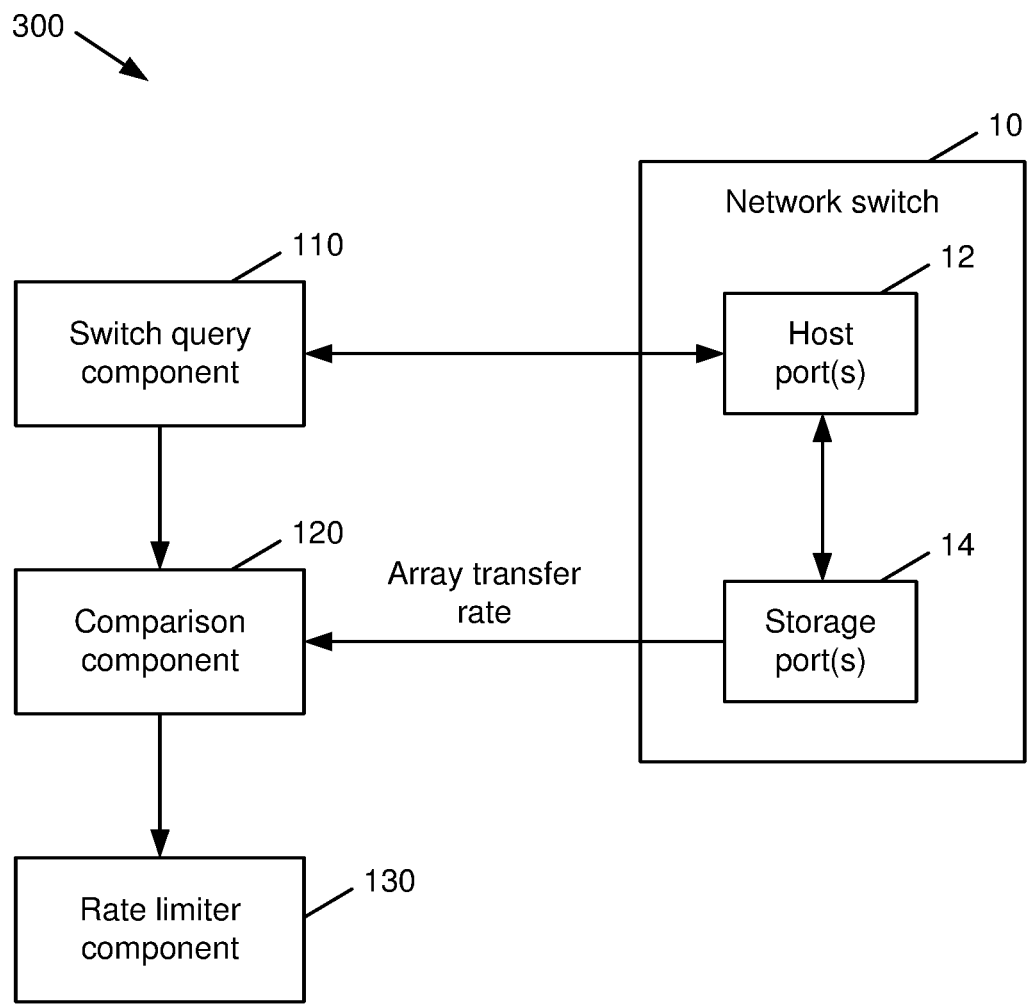
FIG. 3 is a block diagram of a system that facilitates obtaining and processing transfer rate data from a network switch in accordance with various aspects described herein.

With reference now to FIG. 3, a block diagram of a system 300 that facilitates obtaining and processing transfer rate data from a network switch 10 in accordance with various aspects described herein is illustrated. Repetitive description of like elements employed in other embodiments described herein is omitted for brevity. As shown in FIG. 3, the effects of slow drain as described above can be reduced by enabling the switch query component 110 to query the host device 30 for its negotiated speed via one or more host ports 12 of the network switch 10. In the event that the transfer speed negotiated by the storage array 20 exceeds that negotiated by the host device 30 as determined by the comparison component 120, the rate limiter component 130 can limit the transfer speed of the storage array 20 to that negotiated by the host device 30.

As shown by system 300, the comparison component 120 can obtain a transfer rate negotiated between the storage array 20 and the network switch 10 from a storage port 14 of the network switch 10. It should be appreciated, however, that the comparison component 120 could obtain the array-negotiated transfer rate in other ways. For instance, if the comparison component 120 is implemented either directly or indirectly by the storage array 20, the comparison component 120 could obtain the array-negotiated transfer rate from the storage array 20 itself. Other techniques are also possible.

In an aspect, the comparison component 120 can obtain transfer rate information from multiple storage ports 14 that are accessible by one or more given host ports 12 to determine an array-negotiated transfer rate as an aggregate bandwidth among those storage ports 14. As a result, the rate limiter component 130 can be configured to restrict a transfer speed between a storage array 20 and a host device 30 via the network switch 10 (e.g., as shown by FIG. 2) in the event that a host port 12 access multiple storage ports 14 that have an aggregate bandwidth that is larger than that associated with the host port 12.

Figure 4:
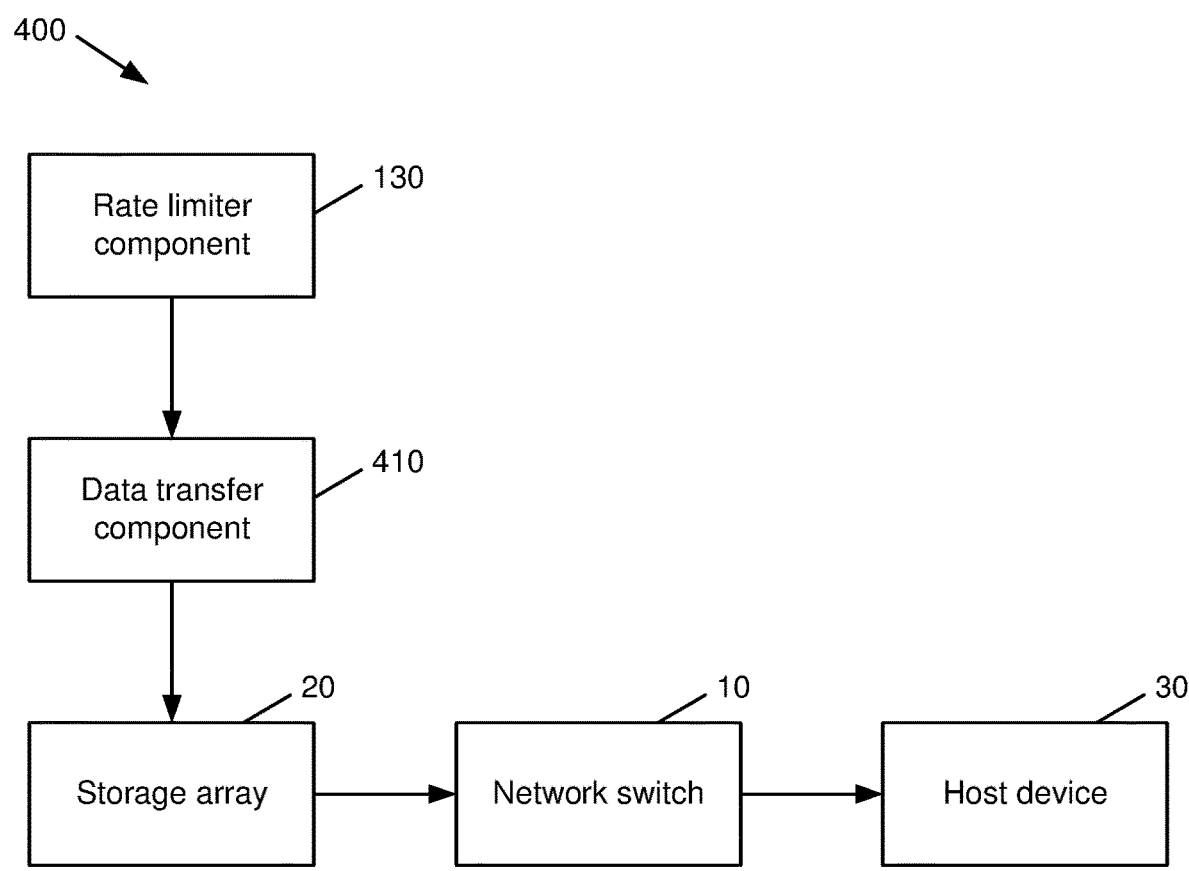
FIG. 4 is a block diagram of a system that facilitates improved data transfer from a storage array to a host device in accordance with various aspects described herein.

Turning now to FIG. 4, a block diagram of a system 400 that facilitates improved data transfer from a storage array 20 to a host device 30 in accordance with various aspects described herein is illustrated. Repetitive description of like elements employed in other embodiments described herein is omitted for brevity. System 400 as shown in FIG. 4 includes a data transfer component 410, which can conduct and/or otherwise direct a data transfer from the storage array 20 to the host device 30 (via the network switch 10) at a transfer rate determined by the rate limiter component 130. As described above, the transfer rate determined by the rate limiter component can be equal to the host-negotiated transfer rate if the host-negotiated transfer rate is less than the array-negotiated transfer rate or the array-negotiated transfer rate otherwise. Other techniques for selecting a transfer rate could also be used.

In an aspect, the network switch 10 can facilitate a connection between the storage array 20 and the host device 30 via FC and/or another transport protocol as described above. This transport protocol can, in turn, enable the storage array 20 and host device 30 to communicate via the network switch 10 using messaging according to a transport protocol (e.g., as structured in FC frames and/or other structural units) that carries SCSI commands and/or other payload corresponding to a storage interface protocol. Further, for a case in which the host device 30 is configured as an initiator and the storage array 30 is configured as a target in the storage interface protocol, only the host device 30 can issue commands and/or otherwise initiate actions in the storage interface protocol. To overcome this limitation, the storage array 20 can obtain the host-negotiated transfer rate as described above via the transport protocol (e.g., FC) in addition to responding to commands issued by the host device 30 via the storage interface protocol (e.g., SCSI) as carried over the transport protocol via the network switch 10. This multi-layered approach can enable the storage array 20 to issue commands to the network switch 10 according to the transport protocol utilized by the network switch 10, in which the storage array is not configured as a passive entity, in order to enable the storage array 20 to obtain the host-negotiated transfer rate from the network switch 10 in a manner that would not be possible according to SCSI and/or other protocols in which the storage array 20 is a passive entity and cannot send commands.

In an aspect, the first protocol utilized to obtain the host-negotiated transfer rate from the network switch 10 can be a communication protocol utilized by the network switch 10, such as FC, an Ethernet transport protocol, and/or any other suitable protocol. Also or alternatively, the second protocol utilized by the data transfer component 410, e.g., for generating payload for a communication with the host device 30 as conducted according to the first protocol, can be a disk interface protocol such as SCSI or the like. Other protocols could also be used.

Figure 5:
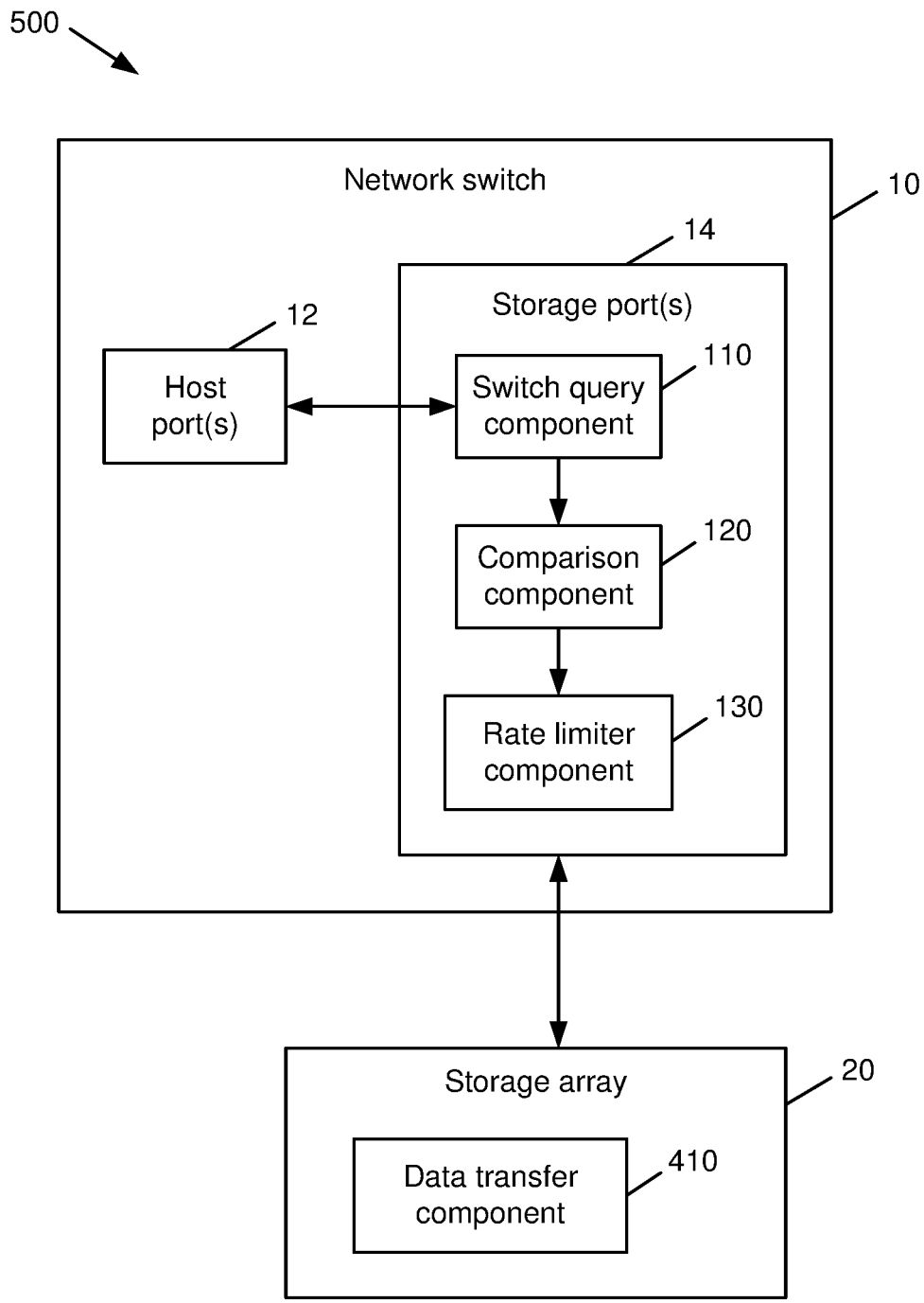
FIG. 5 is a block diagram of a system that facilitates interaction between a network switch and a storage array for slow drain detection and prevention in accordance with various aspects described herein.

With reference next to FIG. 5, a block diagram of a system 500 that facilitates interaction between a network switch 10 and a storage array 20 for slow drain detection and prevention in accordance with various aspects described herein is illustrated. Repetitive description of like elements employed in other embodiments described herein is omitted for brevity. With respect to FIG. 5, while various components are illustrated as being implemented by and/or associated with various devices, it should be appreciated that system 500 illustrates merely an example of an implementation that can be utilized, and some or all of the components illustrated in system 500 could also or alternatively be implemented by other system devices and/or standalone devices as appropriate.

As shown by system 500, the switch query component 110, comparison component 120, and rate limiter component 130 as described above can be implemented wholly or in part by a storage port 14 of the network switch 10, e.g., a port of the network switch 10 to which a storage array 20 is zoned or otherwise connected. In such an implementation, the switch query component 110 at the storage port 14 can obtain the host-negotiated transfer rate from a host port 12 of the network switch, e.g., by issuing one or more commands on a lower level protocol layer (e.g., FC, Ethernet, etc.). In response to these commands, the host port 12 can receive the host-negotiated transfer rate and compare the host-negotiated rate via a comparison component 120 to the transfer rate previously negotiated between the storage port 14 and the storage array 20. Based on this comparison, a rate limiter component 130 at the storage port 14 can impose transfer rate restrictions as appropriate, e.g., by renegotiating the transfer rate between the network switch 10 and the storage array 20 and/or by other suitable means. These restrictions can then be relayed to the storage array 20, which can facilitate data transfers on a higher level protocol layer (e.g., SCSI, etc.) at the rate set by the rate limiter component 130 via a data transfer component 410 at the storage array 20.

Figure 6:
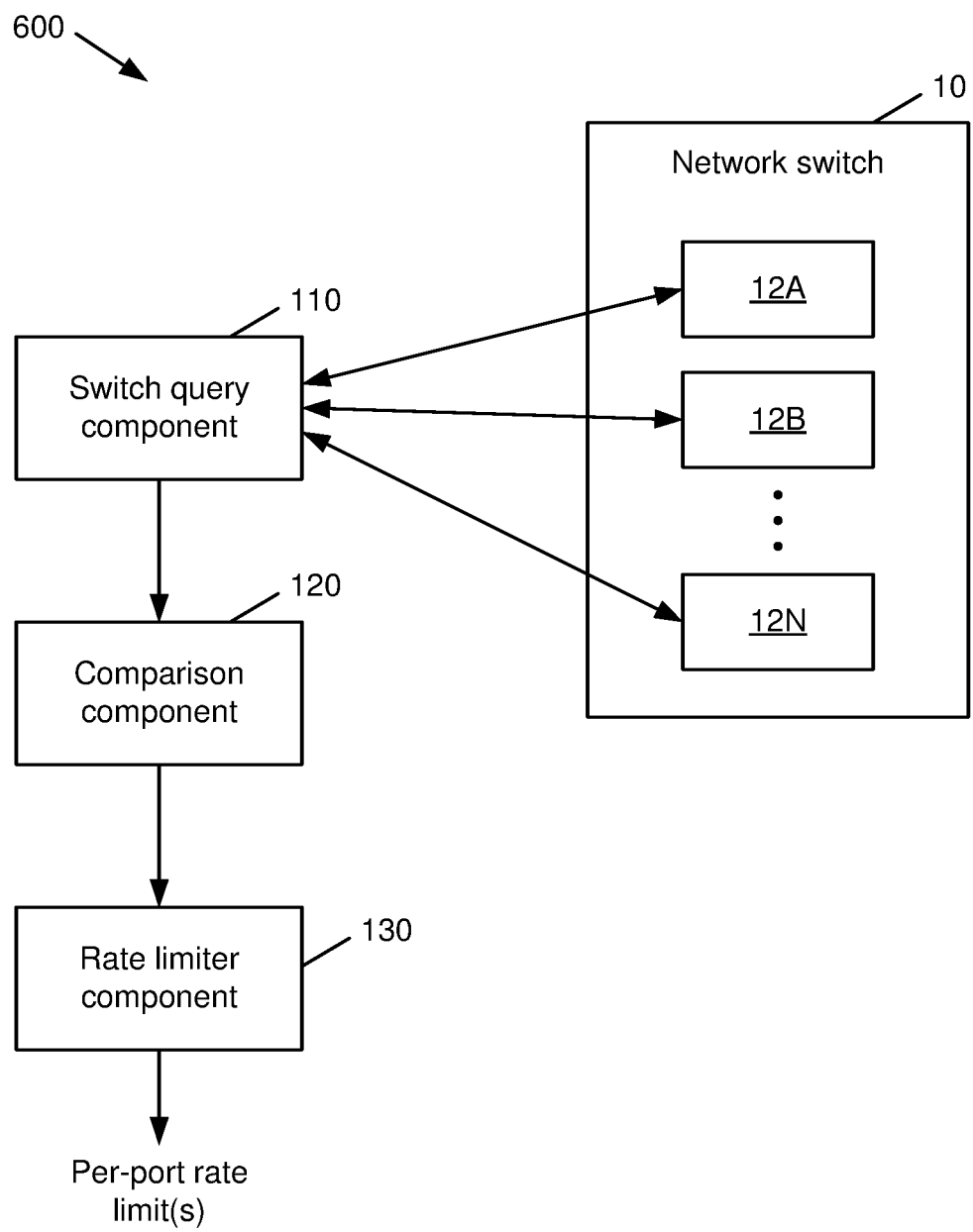
FIG. 6 is a block diagram of a system that facilitates obtaining and processing transfer rate data from respective host-connected ports of a network switch in accordance with various aspects described herein.

Referring now to FIG. 6, a block diagram of a system 600 that facilitates obtaining and processing transfer rate data from respective host-connected ports of a network switch 10 in accordance with various aspects described herein is illustrated. Repetitive description of like elements employed in other embodiments described herein is omitted for brevity. As shown in FIG. 6, a switch query component 110 can obtain a set of host-negotiated transfer rates from respective host ports 12A-12N of a network switch. It should be appreciated that the labeling convention utilized for host ports 12A-12N in system 600 is merely for clarity of illustration and is not intended to imply a specific number of host ports 12A-12N. Rather, the host ports 12A-12N shown in system 600 can include any suitable number of ports, including one port or multiple ports.

As further shown by system 600, a comparison component 120 can compare the respective host-negotiated transfer rates as obtained by the switch query component 110 from the host ports 12A-12N to a transfer rate negotiated between a storage array 20 and the network switch 10. In response to these comparisons, a rate limiter component 130 can set per-port rate limits for respective data transfers from the storage array 20 to one or more host devices 30 via respective ones of the host ports 12A-12N of the network switch 10 having host-negotiated transfer rates that are lower than the array-negotiated transfer rate.

In an aspect, the respective host ports 12A-12N of the network switch 10 can be connected to different host devices 30 and/or multiple ports of the same host device 30. For instance, a host bus adapter at a host device 30 can have multiple ports, each of which can connect to different respective host ports 12A-12N of the network switch at a same host-negotiated transfer rate or different host-negotiated transfer rates. In a further aspect, respective host devices 30 and/or respective ports at a host device 30 can be given unique identifiers, such as a World Wide Name (WWN), that can enable the network switch 10 and/or the storage array 20 to distinguish between respective host devices 30 and/or ports of a host device 30.

Figure 7:
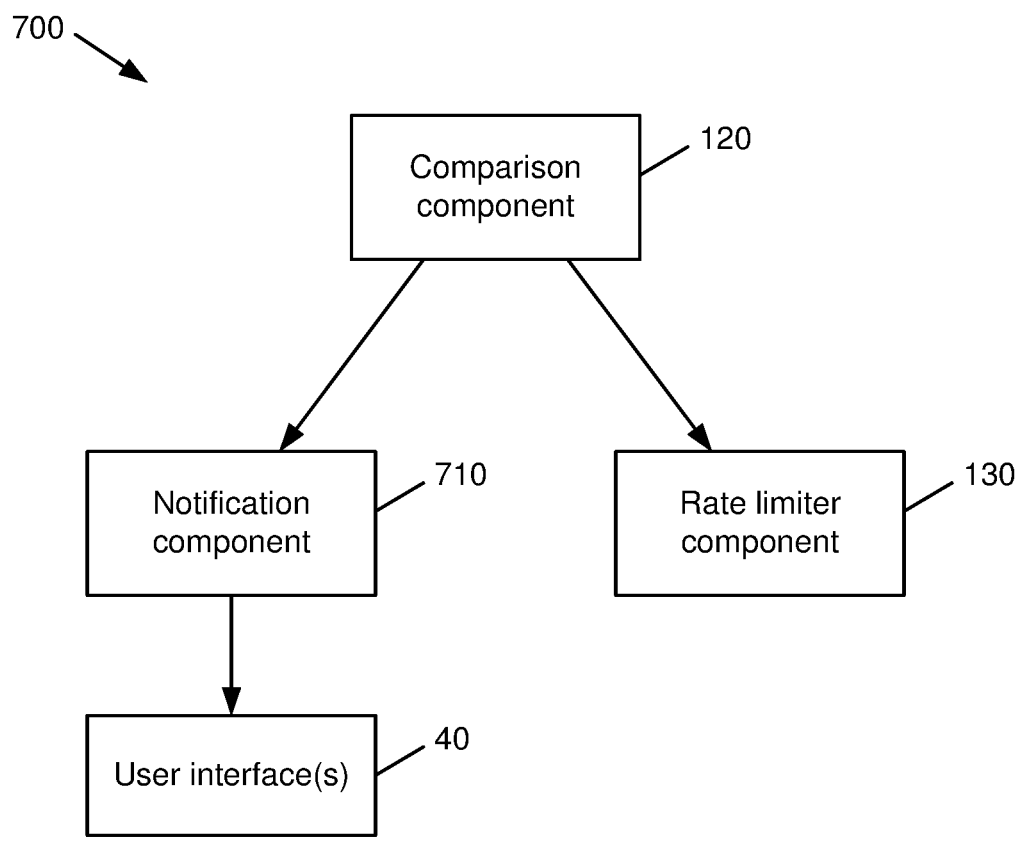
FIG. 7 is a block diagram of a system that facilitates user notifications associated with transfer rate limitations of a data storage system in accordance with various aspects described herein.

Turning to FIG. 7, a block diagram of a system 700 that facilitates user notifications associated with transfer rate limitations of a data storage system in accordance with various aspects described herein is illustrated. Repetitive description of like elements employed in other embodiments described herein is omitted for brevity. System 700 as shown in FIG. 7 includes a notification component 710, which can generate a user notification in response to transfer rate restrictions being placed on the storage array 20, e.g., in response to the comparison component 120 determining that an array transfer rate exceeds a host transfer rate and/or the rate limiter component 130 limiting a data transfer from the storage array to the host transfer rate. In an aspect, a user notification generated by the notification component 710 can be provided to a system administrator and/or other system user via one or more user interfaces 40. The system interface (s) 40 can include, but are not limited to, a graphical interface, a text log such as an event log, a short message service (SMS) notification, etc. In an aspect, notifications provided in this manner by the notification component 710 can inform a system administrator and/or other system users that transfer rate limitations have been set by the rate limiter component 130, thereby facilitating an understanding by the notified user(s) regarding the reason for the storage array 20 not operating at its full transfer speed.

In an aspect, the notification component 710 can also be configured to provide a separate user notification in response to the host transfer rate as described above being determined by the comparison component 120 to be higher than an array transfer rate. This can be useful, for instance, to aid a system administrator and/or other system users in optimizing system performance and mitigating bottlenecks in system traffic.

Figure 8:
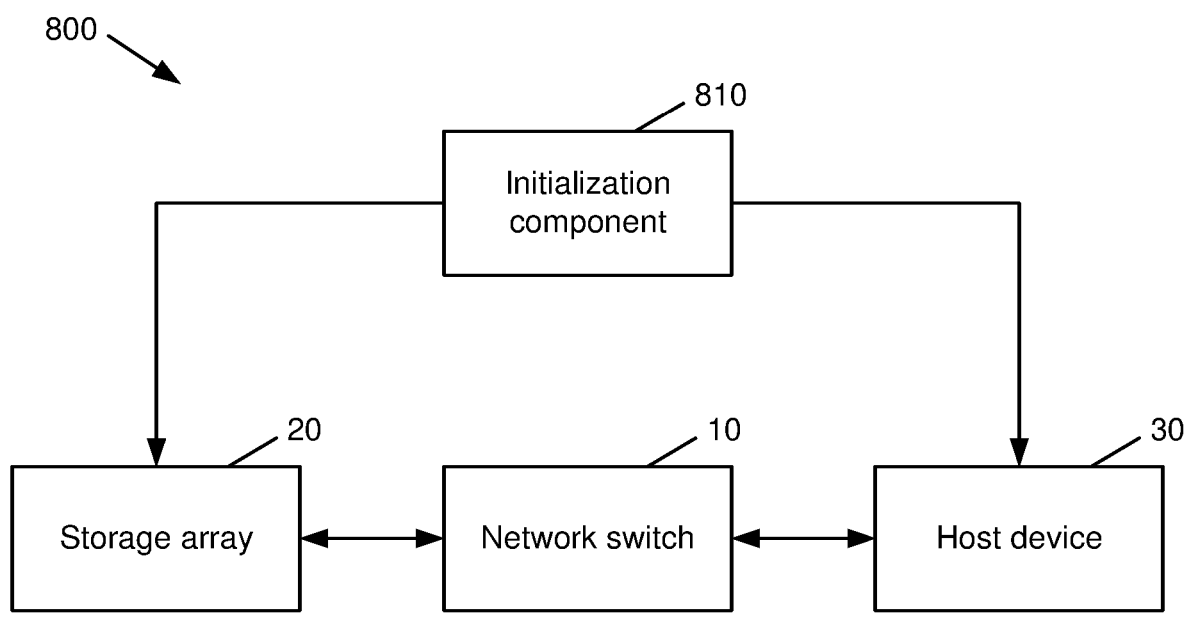
FIG. 8 is a block diagram of a system that facilitates initializing a connection between a storage array and a host device via a network switch in accordance with various aspects described herein.

Referring next to FIG. 8, a block diagram of a system 800 that facilitates initializing a connection between a storage array 20 and a host device 30 via a network switch 10 in accordance with various aspects described herein is illustrated. Repetitive description of like elements employed in other embodiments described herein is omitted for brevity. As shown in FIG. 8, system 800 includes an initialization component 810 that can initialize a connection between the storage array 20 and the host device 30. While a single common initialization component 810 is shown in FIG. 8, it should be appreciated that the storage array 20, the host device 30, and/or the network switch 10 can each have individual initialization components 810 that enable their respective devices to connect with each other and/or with other network devices.

In an aspect, the initialization component 810 can facilitate the connection between the storage array 20 and the host device 30 upon one or both of the devices powering on and/or otherwise being exposed to a networked environment. For instance, the initialization component 810 can facilitate a FC login process between the storage array 20 and the host device 30 via the network switch 10. Other techniques for establishing a connection could also be used.

In another aspect, the switch query component 110 as described above can be configured to obtain host-negotiated transfer speeds from the network switch 10 upon initialization of a connection between the storage array 20 and the host device 30 by the initialization component 810. Subsequently, the switch query component 110 can be configured to utilize the obtained host-negotiated transfer speed for all subsequent operations. Alternatively, the switch query component 110 can be configured to obtain updated transfer speeds at predefined intervals and/or upon occurrence of certain events in the system (e.g., equipment changes or malfunctions, network disruptions, etc.). In the latter case, updated transfer speeds can be obtained by the switch query component 110 in combination with re-establishment of a connection between the storage array 20 and the host device 30 via the initialization component 810.

Figure 9:
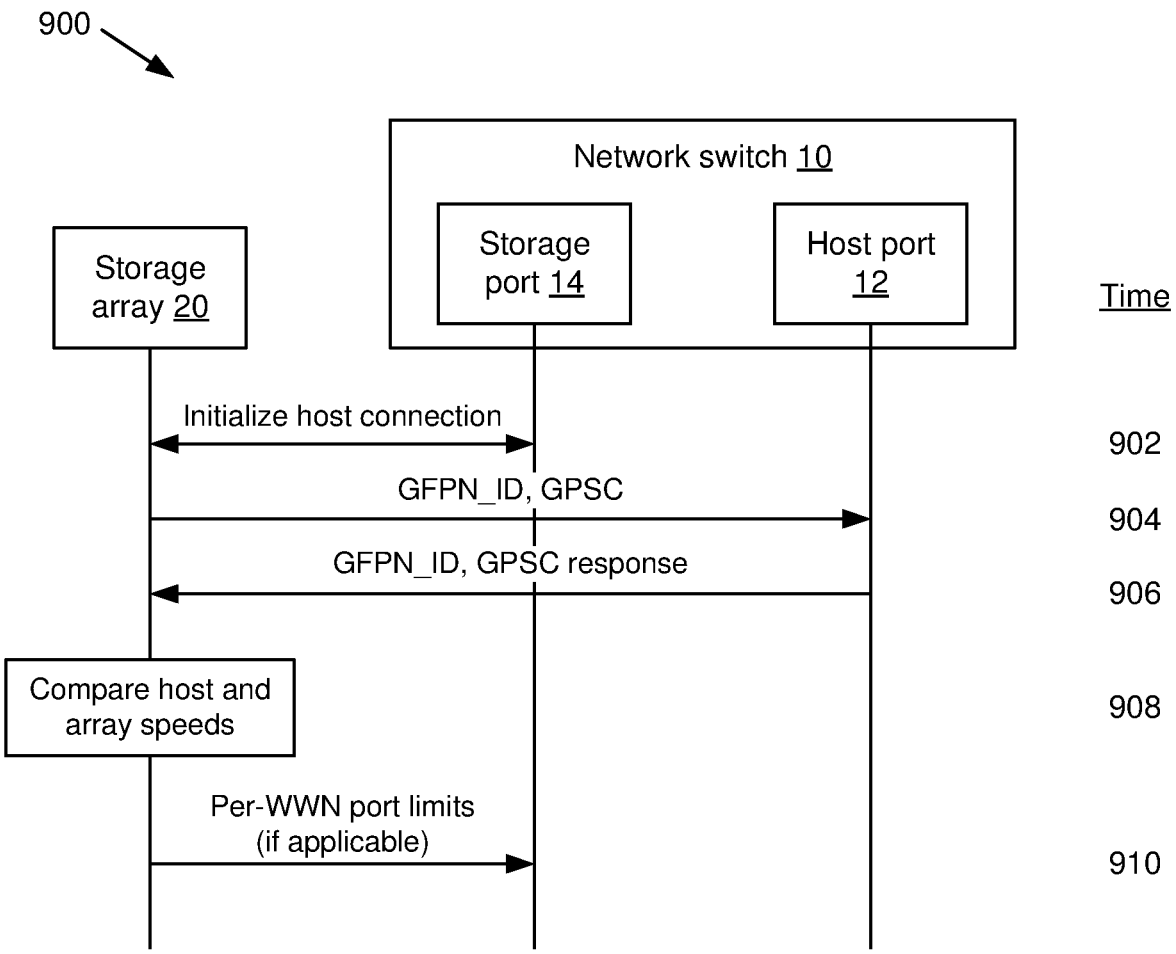
FIG. 9 is a diagram of an example messaging flow that can be conducted between a storage array and a network switch to facilitate slow drain detection and automated resolution in accordance with various aspects described herein.

Turning to FIG. 9, a diagram 900 of an example messaging flow that can be conducted between a storage array 20 and a network switch 10 to facilitate slow drain detection and automated resolution in accordance with various aspects described herein is illustrated. It should be appreciated that the messaging flow and associated operations shown by diagram 900 are intended merely as an example of a messaging flow that can occur between a storage array 20 and a network switch 10 according to an FC protocol, and that other protocols and/or operations could also be used.

At time 902, the storage array 20 can connect to a port of the network switch 10, e.g., a storage port 14, to initialize a connection with a host device 30. In an aspect, the connection between the storage array and host device 30 via the network switch can be established via an initialization component 810 as described above with respect to FIG. 8.

At time 904, the storage array 20 can issue (e.g., via a switch query component 110 as shown in FIG. 1) the low level FC commands GPFN_ID (Get Fabric Port Name—Port Identifier) and GPSC (Get Port Speed Capabilities) to each host port 12 of the network switch 10, e.g., each switch port that a host initiator zoned to the storage port 14 is connected to (e.g., by sending the commands to the storage port 14 and specifying the relevant host port(s) 12 as a target of the commands). At time 906, the host port 12 will relay to the storage array 20 the speed the network switch 10 has negotiated with the corresponding host WWN in response to the commands sent at time 904.

At time 908, the storage array 20 can compare (e.g., via a comparison component 120 as shown in FIG. 1) the speed obtained at time 906 to the negotiated speed of the storage port 14. At time 910, if the host-negotiated speed is lower than the speed negotiated by the storage port 14, the storage array 20 can set, for that storage port 14, a per-WWN port limit that matches the host negotiated speed, thereby ensuring that the storage array 20 does not send data at rates that cannot be consumed by the host device 30.

In addition to setting per-WWN port limits where applicable, the storage array 20 can also provide a notification (e.g., via a notification component 710 as shown by FIG. 7) that per-WWN port limits have been set, thereby enabling a system administrator and/or other user to understand why the storage port 14 is not using its full speed. Alternatively, if the host negotiated speed is higher than the speed negotiated by the storage port 14, the storage array 20 can provide a warning (e.g., via the notification component 710) regarding the difference in speeds between the storage array 20 and the host device 30.

Figure 10:
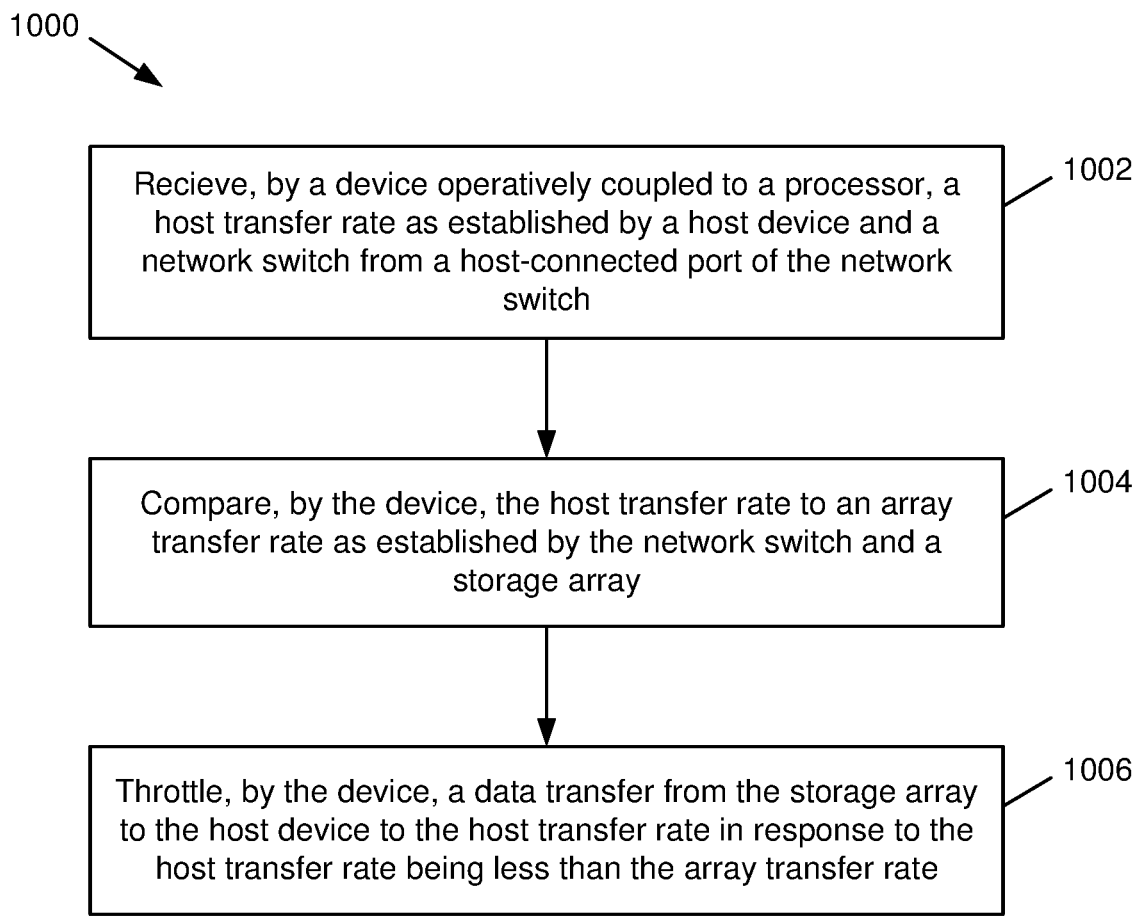
FIG. 10 is a flow diagram of a method that facilitates storage-based slow drain detection and automated resolution in accordance with various aspects described herein.

With reference now to FIG. 10, presented is a flow diagram of a method 1000 that facilitates storage-based slow drain detection and automated resolution in accordance with various aspects described herein. At 1002, a device operatively coupled to a processor can receive (e.g., by a switch query component 110) a host transfer rate as established by a host device (e.g., a host device 30) and a network switch (e.g., a network switch 10) from a host-connected port of the network switch (e.g., a host port 12).

At 1004, the device can compare (e.g., by a comparison component 120) the host transfer rate obtained at 1002 to an array transfer rate as established by the network switch and a storage array (e.g., a storage array 20).

At 1006, the device can throttle (e.g., by a rate limiter component 130) a data transfer from the storage array to the host device to the host transfer rate obtained at 1002 in response to a determination at 1004 that the host transfer rate is less than the array transfer rate.

FIG. 10 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that method can alternatively be represented as a series of interrelated states or events, such as in a state diagram. Moreover, not all illustrated acts may be required to implement methods in accordance with certain aspects of this disclosure.

Figure 11:
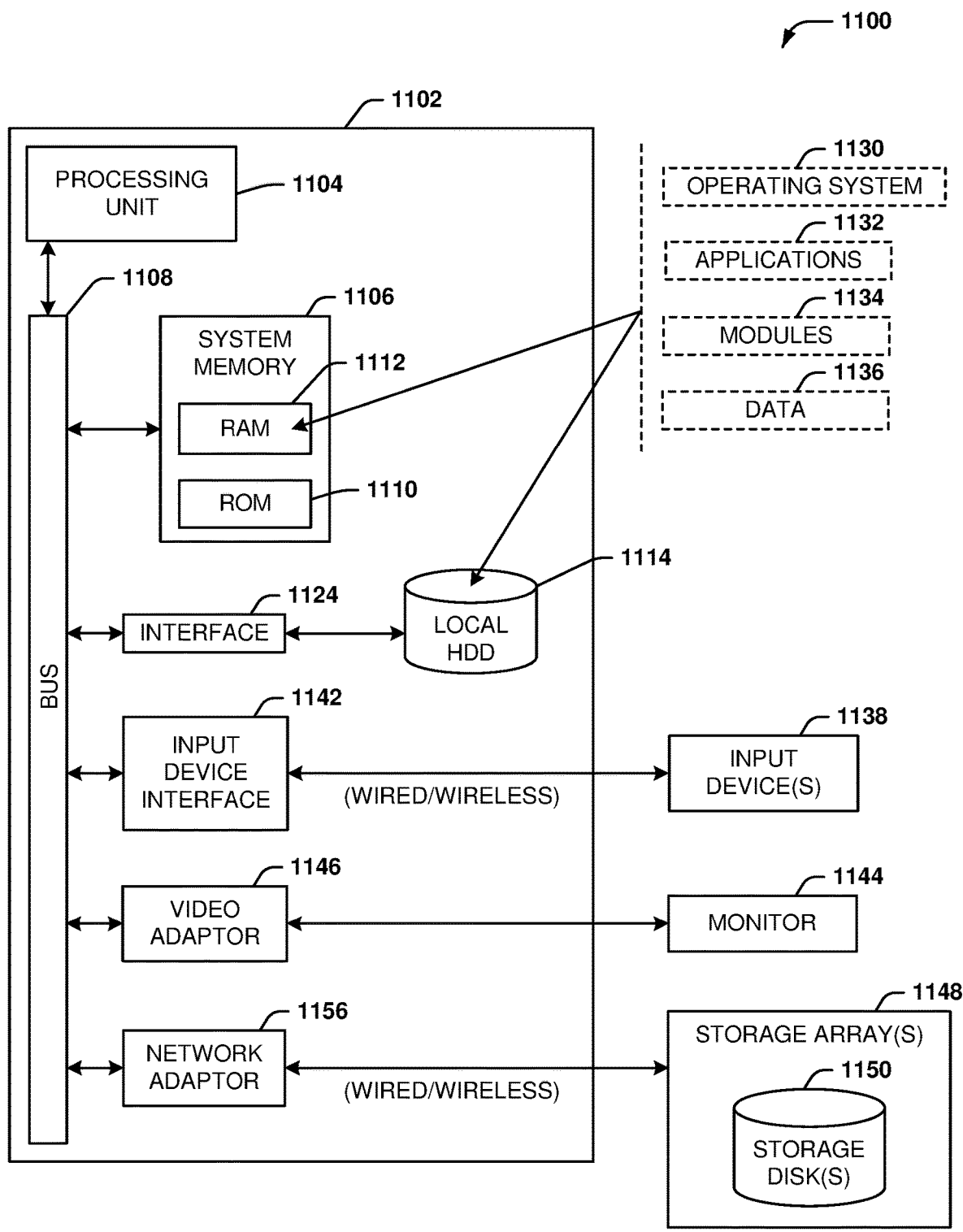
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computing device 1102 (e.g., a server, an embedded system, etc.). In some implementations, the computing device 1102 can include a processing unit 1104, a system memory 1106 and a system bus 1108. The system bus 1108 couples system components including, but not limited to, the system memory 1106 to the processing unit 1104. The processing unit 1104 can include any suitable number and/or types of processors. For instance, in an environment 1100 associated with a data storage system, the processing unit 1104 can include one or more embedded processors and/or microcontrollers. Also or alternatively, the processing unit 1104 can include processors which can be any of various commercially available processors.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computing device 1102, such as during startup. The RAM 1112 can also include a high-speed RAM such as static RAM for caching data.

The computing device 1102 can further include one or more devices that provide local storage, such as a local hard disk drive (HDD) 1114 (e.g., EIDE, SATA). Other storage devices, such as optical disk drives, external HDDs, or the like, can also be employed as suitable for a particular implementation. The HDD 1114 and/or other storage devices can be connected to the system bus 1108 by an HDD interface 1124 and/or other suitable interfaces.

The local storage devices and/or their associated computer-readable storage media provide nonvolatile storage of data, data structures, computer-executable instructions, and so forth. For the computing device 1102, the drives and storage media accommodate the storage of any data in a suitable digital format.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computing device 1102 through one or more wired/wireless input devices 1138, e.g., a keyboard, a pointing device such as a mouse or touchpad, a microphone, an infrared (IR) remote control, a stylus pen, a touch screen, etc. The input devices 1138 can be connected to the processing unit 1104 through an input device interface 1142 that can be coupled to the system bus 1108, but can be connected by other interfaces, such as a parallel port, an IEEE 1394 serial port, a USB port, an IR interface, etc. A monitor 1144 or other type of display device can be also connected to the system bus 1108 via an interface, such as a video adapter 1146.

The computing device 1102 can operate in a networked environment, e.g., in a storage area network (SAN) environment, using logical connections via wired and/or wireless communications, as established by a network adaptor 1156, to one or more remote entities such as remote computers, one or more storage arrays 1148, etc. Remote computers associated with the computing device 1102 can include workstations, server computers, routers, peer devices or other common network nodes, etc. Storage arrays 1148 connected to the computing device 1102 via the network adaptor 1156 can include respective storage disks 1150, which can be configured in any suitable logical and/or physical configurations.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores executable components; and
   a processor that executes the executable components stored in the memory, wherein the executable components comprise:
   a switch query component that obtains a host transfer rate negotiated between a host device and a network switch from a host-connected port of the network switch;
   a comparison component that compares the host transfer rate to an array transfer rate negotiated between the network switch and a storage array, prior to beginning a data transfer from the storage array to the host device; and
   a rate limiter component that predictively limits the data transfer from the storage array to the host device to the host transfer rate in response to the host transfer rate being less than the array transfer rate.

2. The data storage system of claim 1, wherein the switch query component obtains the host transfer rate via messaging with the network switch according to a first protocol, and wherein the executable components further comprise:
   a data transfer component that conducts the data transfer from the storage array to the host device according to the first protocol, wherein a payload of the data transfer is generated according to a second protocol that is different from the first protocol.

3. The data storage system of claim 2, wherein the first protocol comprises a Fibre Channel protocol, and wherein the second protocol comprises a Small Computer System Interface protocol.

4. The data storage system of claim 1, wherein the executable components further comprise:
   a notification component that generates a user notification in response to the rate limiter component limiting the data transfer from the storage array to the host device to the host transfer rate.

5. The data storage system of claim 4, wherein the user notification is a first user notification, and wherein the notification component further generates a second user notification in response to the host transfer rate being greater than the array transfer rate.

6. The data storage system of claim 1, wherein the host transfer rate is a first host transfer rate, wherein the host-connected port of the network switch is a first host-connected port, and wherein the switch query component obtains, from respective ones of a plurality of host-connected ports of the network switch that includes the first host-connected port, a plurality of host transfer rates that include the first host transfer rate.

7. The data storage system of claim 6, wherein the rate limiter component limits respective data transfers from the storage array to the host device via respective ones of the plurality of host-connected ports of the network switch that have host transfer rates that are lower than the array transfer rate.

8. The data storage system of claim 1, wherein the executable components further comprise:
   an initialization component that initializes a connection between the host device and the storage array via the network switch, wherein the switch query component obtains the host transfer rate in response to the connection between the host device and the storage array being initialized.

9. A method, comprising:

receiving, by a device operatively coupled to a processor, a host transfer rate as established by a host device and a network switch from a host-connected port of the network switch;

comparing, by the device, the host transfer rate to an array transfer rate as established by the network switch and a storage array, prior to beginning a data transfer from the storage array to the host device; and preemptively throttling, by the device, the data transfer from the storage array to the host device to the host transfer rate in response to the host transfer rate being less than the array transfer rate.

10. The method of claim 9, wherein the receiving comprises receiving the host transfer rate via messages exchanged according to a first protocol, and wherein the method further comprises:

generating, by the device, a payload of the data transfer from the storage array to the host device according to a second protocol that is different from the first protocol; and conducting, by the device, the data transfer from the storage array to the host device according to the first protocol.

11. The method of claim 10, wherein the first protocol comprises a Fibre Channel protocol, and wherein the second protocol comprises a Small Computer System Interface protocol.

12. The method of claim 9, further comprising:

generating, by the device, a user notification in response to the host transfer rate being less than the array transfer rate.

13. The method of claim 9, wherein the host transfer rate is a first host transfer rate, wherein the host-connected port of the network switch is a first host-connected port, and wherein the receiving comprises receiving, from respective ones of a plurality of host-connected ports of the network switch that includes the first host-connected port, a plurality of host transfer rates that include the first host transfer rate.

14. The method of claim 13, wherein the throttling comprises throttling respective data transfers from the storage array to the host device via respective ones of the plurality of host-connected ports of the network switch that have host transfer rates that are lower than the array transfer rate.

15. The method of claim 9, further comprising:

establishing, by the device, a connection between the host device and the storage array via the network switch, wherein the receiving comprises receiving the host transfer rate in response to the establishing being completed.

16. A machine-readable storage medium comprising executable instructions that, when executed by a processor, facilitate performance of operations, the operations comprising:

obtaining a first transfer rate as established between a host device and a network switch from a port of the network switch to which the host device is connected;

comparing the first transfer rate to a second transfer rate as established between the network switch and a storage device; and based on a result of the comparing, preemptively limiting a future data transfer from the storage device to the host device to the first transfer rate in response to the first transfer rate being less than the second transfer rate.

17. The machine-readable storage medium of claim 16, wherein the operations further comprise:

obtaining the first transfer rate via commands issued according to a first protocol;

generating a payload of the data transfer from the storage device to the host device according to a second protocol that is different from the first protocol; and conducting the data transfer from the storage device to the host device according to the first protocol.

18. The machine-readable storage medium of claim 17, wherein the first protocol comprises a Fibre Channel protocol, and wherein the second protocol comprises a Small Computer System Interface protocol.

19. The machine-readable storage medium of claim 16, wherein the operations further comprise:

generating an event log in response to limiting the data transfer rate to the first transfer rate.

20. The machine-readable storage medium of claim 16, wherein the operations further comprise:

establishing a connection between the host device and the storage device via the network switch; and obtaining the first transfer rate in response to the establishing being completed.

* * * * *